US006365537B1

(12) United States Patent
Windisch et al.

(10) Patent No.: US 6,365,537 B1
(45) Date of Patent: Apr. 2, 2002

(54) TWO-COMPONENT SUPPORTED CATALYSTS AND THEIR USE FOR GAS-PHASE POLYMERIZATION

(75) Inventors: Heike Windisch, Bergisch Gladbach; Norbert Steinhauser, Monheim, both of (DE)

(73) Assignee: Bayer AG, Leverkusen (DE)

( * ) Notice: Subject to any disclaimer, the term of this patent is extended or adjusted under 35 U.S.C. 154(b) by 0 days.

(21) Appl. No.: 09/151,828

(22) Filed: Sep. 11, 1998

(30) Foreign Application Priority Data

Sep. 19, 1997 (DE) .......................................... 197 41 402

(51) Int. Cl.$^7$ ................................................. B01J 31/00
(52) U.S. Cl. ........................ 502/117; 502/102; 502/103
(58) Field of Search ................................ 502/102, 103, 502/117

(56) References Cited

U.S. PATENT DOCUMENTS 5,453,471 A   9/1995   Bernier et al. ................. 526/68

FOREIGN PATENT DOCUMENTS

| DE | 26 23 693 | 12/1976 |
|---|---|---|
| DE | 43 34 045 | 4/1995 |
| EP | 727 477 | 2/1996 |
| WO | 93 04323 | 1/1996 |
| WO | 96 04322 | 2/1996 |
| WO | 96 10542 | 4/1996 |
| WO | 96 31543 | 10/1996 |
| WO | 96 31544 | 10/1996 |

*Primary Examiner*—Elizabeth D. Wood
(74) *Attorney, Agent, or Firm*—Connolly Bove Lodge & Hutz LLP

(57) ABSTRACT

The present invention relates to a two-component supported catalyst, consisting of
  a) at least one transition metal compound applied on to an inorganic or polymeric organic supporting material, the metal being selected from the group of the d and f elements of the periodic table according to Mendeleev,
  b) at least one organometallic compound applied on to an inorganic or polymeric organic supporting material, the metal being selected from the group of the IIa, IIb and IIIb elements of the periodic table (F. A. Cotton, G. Wilkinson, Anorganische Chemie, 4th edition, VCH Verlagsgesellschaft mbH, Weinheim, 1985) and
  c) optionally at least one modifier which is supported on a) and/or on b), the transition metal compound in component a) being used in quantities of 0.1 to 100 mmol, based on 100 g of the supporting material, and the organometallic compound in component b) being used in quantities of 0.1 to 100 mmol, based on 100 g of the supporting material, and component c) being used in quantities of 0.01 to 500 mmol, based on 100 g of the supporting material, and the supporting materials of components a) to b) being used in quantitative ratios by weight (g/g) of $1.10^{-3}$ to 1000, and at least one of components a) or b) having a supporting material with an average particle size before or during polymerisation of <25 µm.

19 Claims, No Drawings

TWO-COMPONENT SUPPORTED CATALYSTS AND THEIR USE FOR GAS-PHASE POLYMERIZATION

BACKGROUND OF THE INVENTION

1. Field of the Invention

The invention relates to a two-component supported catalyst, its preparation and its use for the polymerisation of unsaturated compounds, especially of conjugated dienes, in the gas phase.

2. Description of the Prior Art

The polymerisation of conjugated dienes in solution has the disadvantage that, when the unreacted monomer and the solvent are separated from the polymer that has formed, low-molecular weight compounds can enter the environment via outlet air and waste water and therefore have to be disposed of by appropriate means. In addition, large quantities of solvents have to be used and separated off with high energy costs. The solvents are generally flammable and easy to ignite and therefore represent a potential hazard.

In recent years, the gas-phase process has proved particularly advantageous for the preparation of polyethylene and polypropylene in particular, and has become established in the industry. The advantages of the gas-phase process are primarily based on the fact that no solvents are used and emissions and waste water contaminations can be reduced.

Supported catalysts have been developed for implementing the gas-phase process, Ziegler-Natta catalysts being used among others. The supported catalysts may be prepared by impregnating the supporting material with solutions of the metal compounds and with solutions of the co-catalysts, simultaneously or consecutively, so that all of the catalyst is applied on to one supporting material. Examples of this include catalysts based on the rare earths (e.g. DE 43 34 045, EP 727 447, WO 96/31543, WO 96/31544). During this supporting process, the Ziegler-Natta catalyst is bonded to the supporting material in a catalytically active form and is thus very sensitive to impurities. Another disadvantage lies in the fact that the catalyst can age when stored for a prolonged period, which is accompanied by a change in catalyticselectivity and activity. This has a disadvantageous effect on product qualities and space time yields.

Another variant for preparing catalysts for gas-phase polymerisation consists in that, during polymerisation, one or more catalyst components in dissolved form are sprayed into the reaction chamber in which there is e.g. a fluidised bed of inert solid particles (cf. e.g. WO 96/04323, WO 96/0432, U.S. Pat. No. 5,453,471).

It is a disadvantage of these catalysts that part of the catalyst system is sprayed into the gas-phase process in solution, as a result of which solvent can accumulate in the reactor, especially in a continuous process. The solvent then has to be removed from the polymerisation product again, which makes the gas-phase process less economical. Furthermore, the polymer may stick together as a result of swelling with the solvent, especially in the case of dienes, and therefore a large quantity of powdered material is required in the reaction bed. Since this can lead to a reduction in product quality, large quantities of powdered material should be avoided if possible.

Another method of preparing catalysts is known for the gas-phase polymerisation of polyolefins. According to DE 26 23 693, the transition metal compound is used in solid form, an organometallic compound is applied on to a suitable supporting material and the gas-phase polymerisation of ethylene is carried out with a mixture of the two catalyst components.

In WO 96/10542, catalysts are described in which the transition metal compound and the organometallic compound are bonded on to supporting materials separately and the mixture of the two components is used for the polymerisation of olefins. In the patent examples, the same supporting material (Davison 948 silica) is used for both catalyst components and the polymerisation takes place after superposition of the two components. The supporting material "Davison 948 silica" consists of spherical agglomerates with an average particle diameter of 30 to 100 $\mu$m and is often used for gas-phase polymerisations.

The catalysts described in WO 96/10542 for the preparation of polyolefins are used with methylaluminoxane as co-catalyst. Based on the metallocene compounds used as the transition metal compound (TM compounds), the co-catalyst is used in a high molar excess, a further excess of co-catalyst having no disadvantageous effect on the activity of the catalyst, so that the maximum proportion of the co-catalyst in the catalyst system is primarily limited by economic considerations.

When preparing catalysts for the gas-phase polymerisation of conjugated dienes, on the other hand, it must be ensured that the molar ratio of TM compound to special components of the co-catalysts is kept within narrow limits, too much or too little of this component leading to the deactivation of the catalyst system.

Because the polymers tend to stick together, the catalyst has to be kept moving during the polymerisation, e.g. by stirring or by a gas stream, in order to prevent the catalyst particles from sticking together during the polymerisation.

DESCRIPTION OF THE PREFERRED EMBODIMENTS

The object of the present invention is now to avoid the disadvantages of the supported catalysts used up to the present for the polymerisation of diolefins in the gas phase and to provide supported catalysts which may be used without solvents, are particularly stable in storage and simple to produce, and match or even exceed the supported catalysts known up to the present in terms of activity, selectivity and reaction conditions, and may be used in the production of polymers having a tendency to stick together.

SUMMARY OF THE INVENTION

The present invention therefore provides a two-component supported catalyst consisting of a) at least one transition metal compound applied on to an inorganic or polymeric organic supporting material, the transition metal being selected from the group of the d and f elements of the periodic table according to Mendeleev b) at least one organometallic compound applied on to an inorganic or polymeric organic supporting material, the metal being selected from the group of the IIa, IIb and IIIb elements of the periodic table [(F. A. Cotton, G. Wilkinson, Anorganische Chemie, 4th edition, VCH Verlagsgesellschaft mbH, Weinheim, 1985)] and c) optionally at least one modifier which is supported on a) and/or on b), the transition metal compound in component a) being used in quantities of 0.1 to 100 mmol, based on 100 g of the supporting material, and the organometallic compound in component b) being used in quantities of 0.1 to 1000 mmol, based on 100 g of the supporting material, and component c) being used in quantities of 0 to 500 mmol, based on 100 g of the supporting material, and the supporting materials of components a) to b) being used in quantitative ratios by weight (g/g) of $1:10^{-3}$ to 1000, and at least one of components a) or b) having a supporting material with an average particle size before and/or during polymerisation of <25 μm, preferably <10 μm, particularly preferably <2 μm.

The transition metal compound in component a) is preferably used in quantities of 0.5 to 50 mmol, based on 100 g of the supporting material, and the organometallic compound in component b) is preferably used in quantities of 0.5 to 500 mmol, based on 100 g of the supporting material, and the modifier in component c) is preferably used in quantities of 0 to 250 mmol, based on 100 g of the supporting material.

The molar ratio of the compounds of components a) to b) to c) applied on to the supporting materials depends on the catalyst system used. Those molar ratios known for the Ziegler-Natta catalyst systems in solution polymerisation are preferably used. The molar ratios of components a):b):c) are 1:1 to 10 000:0 to 1000, preferably 1:1 to 1000:0 to 100.

Those transition metal compounds used for Ziegler-Natta catalysts for diene polymerisation are preferably used for component a). The rare earth elements, such as lanthanum, cerium, praseodyrnium, neodymium, terbium, dysprosium, holmium, erbium, as well as titanium, zirconium, vanadium, chromium, cobalt, iron and nickel, are particularly preferred, especially lanthanum, cerium, neodymium, cobalt, nickel, titanium, vanadium, especially preferably lanthanum, neodymium and cobalt.

Suitable transition metal compounds are particularly those with inorganic groups, e.g. halides, sulfate, sulfonate, phosphate, phosphonate and carbonate groups, those with organic groups, such as β-diketones, carboxylate, alcoholate, phenolate and amide groups, and organo-metal compounds, such as e.g. monocyclopentadienyl, mono-indenyl and monofluorenyl metal compounds.

Those organometallic compounds used as co-catalysts in Ziegler-Natta catalysts are preferably used for component b). Compounds of the metals of Groups IIa, IIb and IIIb of the periodic table of the elements may preferably be mentioned, particularly preferably magnesium, calcium, boron, aluminium, zinc, particulary preferably aluminium and magnesium.

Furthermore, the aluminoxanes known in the literature may be used as organometallic compounds of component b), methylaluminoxane and iso-butylaluminoxane being particularly mentioned.

The compounds known for Ziegler-Natta catalysts may be used as modifiers (component c), such as e.g. organic halogen compounds, halogenated silanes, suitable Lewis acids, suitable Lewis bases and mono- or polyunsaturated organic compounds.

Particulate, inorganic solids or particulate, polymeric organic solids with a specific surface >10, preferably 10 to 1000 m$^2$/g (BET) and a pore volume of 0 to 15, preferably of 0.3 to 5 ml/g, which display inert behaviour during the polymerisation reaction, are used as supporting materials for components a) and b) of the catalyst according to the invention. The average particle size of the supporting materials is 0.1 μm to 5 mm, preferably 0.5 μm to 2 mm, at least one supporting material possessing average particle sizes of <25 μm, preferably <10 μm and particularly preferably <2 μm, this average particle size being present before the polymerisation or being formed during the polymerisation by breakdown of the support particles, preferably by deagglomeration of the support particle.

In the catalysts according to the invention the supporting materials of component a) and component b) may be the same or different.

Supporting materials in which the transition metal compounds of component a) are applied on a supporting material with large-volume pores and the metal compounds of component b) are applied on a supporting material with finer particle size are particularly preferably used for components a) and b), the pore radius of the supporting material of component a) being larger than the particle diameter of the supporting material of component b) so that the fine particle size supporting material can be inserted into the pores of the large-volume supporting material.

The specific surface (BET) of the supporting material is determined by conventional means [cf. e.g. S. Brunauer, P. H. Emmet and Teller, J. Amer. Chem. Soc. 60(2) (1938) 309], the pore volume is determined by the centriflugation method [M. McDaniel, J. Colloid Interface Sci. 78 (1980) 31]. The particle size given represents the number average of the support particles and is referred to as average particle size. The average particle size is determined by conventional means, e.g. with the aid of a Mastersizer (range of 1 to 600 μm) or with the aid of electron micrographs.

Silica gels, precipitated silicas, aerosils, clays, aluminosilicates, talcum, zeolites, carbon black, graphite, activated carbon, inorganic oxides, such as e.g. aluminium oxide, magnesium oxide and titanium dioxide, silicon carbide, inorganic salts, such as e.g. barium sulfate, magnesium sulfate, magnesium chloride, calcium carbonate are particulary suitable as inorganic solids for the supporting material, particularly preferably precipitated silicas, carbon black and activated charcoal. Organic supporting materials, such as e.g. polyethylene, polypropylene, polystyrene or polybutadienes, are also suitable.

The inorganic solids mentioned, which meet the aforementioned specification and are therefore suitable for use, are described in more detail in, for example, Ullmanns, Encylopädie der technischen Chemie, volume 21, p. 439 ff. (silica gels), volume 23, p. 311 ff. (clays), volume 14, p. 633 ff. (carbon blacks), volume 24, p. 575 ff. and volume 17, p. 9 ff. (zeolites).

The transition metal compounds for component a) are described in detail in the literature and are known to the expert (cf. e.g. L. Porri, A. Giarrusso in Comprehensive Polymer Science, G. C. Eastmond, A. Ledwith, S. Russo, P. Sigwalt, eds., vol. 4, part II, Pergamon Press Ltd., Oxford, 1989, pp. 53).

Of the rare earth compounds, the compounds listed in EP 727 447 and the allyl compounds of the rare earths mentioned in WO 96/31544 may also be used.

Just a few representative transition metal compounds, which are particulary preferably used, will therefore be mentioned:

neodymium chloride, neodymium bromide, neodymium iodide, neodymium pivalate, neodymium versatate, tris(allyl)neodymium, di(allyl)neodymium chloride, allyl-neodymium dichloride, cyclopentadienyl di(allyl) neodymium, pentamethylcyclo-pentadienyl di(allyl) neodymium, cobalt(II) octanoate, cobalt(II) chloride, cobalt (II) bromide, cobalt(II) acetylaceto-nate, cobalt(III) acetylacetonate, cobalt(II) bromide bis(triphenylphosphine), cobalt(II) bromide bis(pyridine), cyclopentadienyltitanium trichloride, pentamethylcyclopentadienyltitanium trichloride, titanium diodide dichloride, titanium tetrachloride, titanium triiodide ethoxide, vanadium(III) acetylacetonate, cyclopentadienylvanadium trichloride, methylcyclo-pentadiene vanadium dichloride, pentamethyl-cyclopentadiene vanadium dichloride, methylcyclopentadi-enylvanadium dichloride bis(triethyl phosphane), nickel(II) octanoate, nickel(II) acetylacetonate, nickel(II) chloride, nickel(II) bromide.

The transition metal compounds may be used both individually and in a mixture with one another. The mixing ratio which is favourable in each case can easily be determined by appropriate preliminary tests.

The organometallic compounds to be used for component b) are described in detail in, for example, G. Wilkinson, F. G. A. Stone, E. W. Abel, Comprehensive Organometalic Chemistry, Pergamon Press Ltd., New York, 1982, vol. 1 and vol. 3 and in E. W. Abel, F. G. Stone, G. Wilkinson, Comprehensive Organometallic Chemistry, Pergamon Press Ltd., Oxford, 1995, vol. 1 and 2.

The following may particularly preferably be mentioned as organometallic compounds of component b), which may again be used individually or in a mixture with one another: dibutylmagnesium, butyl ethylmagnesium, butyl octylmagnesium, trimethyl-aluminium, triethylaluminium, tri-n-propylaluminium, triisopropylaluminium, tri-n-butylaluminium, triisobutylaluminium, tripentylaluminium, trihexylaluminium, tricyclohexylaluminium, trioctylaluminium, triethylaluminium hydride, di-n-butylaluminium hydride and di-isobutylaluminium hydride, ethylaluminium dichloride, diethylaluminium chloride, ethylaluminium sesquichloride, ethylaluminium dibromide, diethylaluminium bromide, ethylaluminium diiodide, diethylaluminium iodide, diisobutylaluminium chloride, octylaluminium dichloride, dioctylaluminium chloride.

The present invention also provides a process for the preparation of the two-component supported catalyst described above, which is characterised in that, to prepare component a), at least one transition metal compound is dissolved or dispersed in an inert solvent and/or diluent, optionally in the presence of component c), at temperatures of −80 to 150° C., the supporting material is impregnated with this solution or dispersion and then the inert solvent and/or diluent is removed at temperatures of −40 to 150° C., optionally under reduced pressure, and that, to prepare component b), at least one organometallic compound is dissolved or dispersed in an inert solvent and/or diluent, optionally in the presence of component c), at temperatures of −80 to 150° C., the supporting material is treated with this solution or dispersion and the inert solvent and/or diluent is then removed at temperatures of −40 to 150° C., optionally under reduced pressure.

For component a), the transition metal compound to be used is dissolved or dispersed in a suitable solvent and/or diluent, optionally in the presence of component c), preferably at temperatures of −50 to 120° C., especially at −20 to 100° C., and the inert solvent and/or diluent used is preferably removed at temperatures of −20 to 140° C., particularly preferably at temperatures of 0 to 120° C., optionally under reduced pressure, after impregnation.

The following are particularly suitable as solvents and/or diluents: aliphatic, cycloaliphatic and/or aromatic solvents, such as butane, pentane, n-hexane, c-hexane, benzene, toluene, xylene, halogenated hydrocarbons such as methylene chloride and/or chlorobenzene, ethers such as tetrahydrofuran, diethyl ether, dimethoxyethane and/or dioxane, thio ethers such as tetrahydrothiophene, tertiary arnines such as trimethylamine, triethylamine and/or dimethylaniline, water or alcohols such as methanol, ethanol and/or isopropanol and/or ketones such as acetone, methyl ethyl ketone and/or diethyl ketone. The solvents and/or diluents may be used individually or in a mixture with one another.

For catalyst component b) the organometallic compound is dissolved in a suitable solvent, optionally in the presence of a component c), preferably at temperatures of −50 to 120° C., particularly at −20 to 100° C., and the solvent is removed after impregnation, optionally under reduced pressure.

Aliphatic, cycloaliphatic and/or aromatic solvents, such as butane, pentane, n-hexane, c-hexane, benzene, toluene, xylene, which may be used individually or in a mixture with one another, are particularly suitable as solvents.

The catalyst component b) can, in principle, be prepared in the same way as catalyst component a).

The quantity of inert solvent and/or diluent used can be varied within broad limits for components a) and b). For reasons of economy, the quantity will be kept as low as possible. The minimum quantity depends on the quantity and solubility of the individual compounds and the pore volume of the supporting material. A quantity of 10 to 2000 parts of the solvent and/or diluent, based on 100 parts of the supporting material, is preferably used.

The invention also provides the use of the two-component supported catalysts according to the invention for the polymerisation of unsaturated compounds, particularly for the polymerisation of conjugated dienes, preferably of 1,3-butadiene, isoprene, 1,3-pentadiene, 2-methyl-1,3-pentadiene, 4-methyl-1,3-pentadiene and/or 2,4-hexadiene, in the gas phase.

For this use, the catalyst components a) and b) are preferably mixed immediately before the polymerisation reaction and the freshly prepared catalyst mixture is introduced into the polymerisation chamber.

However, it is also possible to add the catalyst components separately to the polymerisation chamber.

The gas-phase polymerisation takes place in that the monomers to be polymerised are brought into contact with the catalyst described. Other gases, which are used either for dilution or for heat dissipation or for regulating the molecular weight, may also be mixed in with the monomers that are present in gaseous form. Examples of such gases are: nitrogen, argon, hydrogen, hydrocarbons such as e.g. methane, ethane, propane, butane and 1,2-butadiene. In addition, one or more 1-olefins which exist in gaseous form under the polymerisation conditions may optionally be added, such as e.g. ethylene, propene, 1-butene, 1-hexene, 1-octene, styrene, methylstyrene.

The polymerisation is usually carried out under pressures of 1 mbar to 50 bar, preferably at 1 to 20 bar. The temperatures are generally −20 to 250° C., preferably 0 to 200° C., particularly preferably 20 to 160° C.

The catalysts according to the invention may, of course, also be used for the polymerisation of unsaturated compounds by the solution or suspension process.

In a common embodiment, gas-phase polymerisation is carried out as follows: the catalyst according to the invention is transferred into a piece of apparatus which is suitable for keeping the powdered catalyst in movement. This may be achieved e.g. by stirring, turning, shaking and/or a gas stream. The inert gas initially present in the gas space, e.g. argon, is then replaced by the gaseous monomer. Polymerisation then begins and the temperature rises. The monomer, optionally diluted with an inert gas, is fed into the reactor at a rate such that the desired reaction temperature is not exceeded. The reaction temperature may also be adjusted in the conventional way by heating or cooling. Polymerisation is stopped by turning off the monomer supply or by adding deactivators, such as e.g. acetone, methanol, water, oxygen, carbon dioxide. The polymer may be further treated by known means in that the catalyst is deactivated and the polymer is treated with e.g. known antioxidants, such as e.g. sterically hindered phenols and/or aromatic amines, in conventional quantities.

EXAMPLES

Example 1

1a) Preparation of Partial Component A 23.0 g of the support Accurel EP 100 (microporous PP from Akzo Nobel, particle size distribution 400–1000 μm) were heated to 80° C. for 2 h in vacuo in a 500 ml two-neck flask. This was then cooled to ambient temperature and argon was added to the flask. A solution of 1.15 mmol neodymium versatate in 155 ml hexane was added to the supporting material under inert conditions. After distilling off the solvent at 50° C. in vacuo, 23.8 g of a free-flowing powder were obtained.

1b) Preparation of Partial Component B 43 ml of a solution of 17.3 mmol DIBAH and 0.4 mmol EASC in hexane were added to 8.64 g of the precipitated silica Vulkasil S (dried at 800° C., average particle size 18 μm) in a 250 ml two-neck flask under inert conditions and the solvent was then removed by distillation in vacuo at 50° C. 11.2 g of a free-flowing powder were obtained.

1c) Polymerisation 2.0 g of the partial component A described in 1a) and 2.04 g of the partial component B described in 1b) were introduced, under inert conditions, into a 250 ml glass flask provided with a KPG stirrer, a hot-air blower for heating and cooling and connections for vacuum, argon and butadiene feed. A vacuum was applied and butadiene was then added to the flask up to a pressure of 1150 mbar, with stirring. Over a period of 3 h, the butadiene pressure was kept between 1150 and 1000 mbar at an internal temperature of 60° C. The polymerisation was terminated by removing the butadiene and filling the flask with atmospheric oxygen. 76.0 g of product were obtained.

Comparative Example 2

2a) Preparation of Partial Component A

The partial component described in 1a) was used.

2b) Preparation of Partial Component B 42 ml of a solution of 21.0 mmol DIBAH and 0.5 mmol EASC in hexane were added to 10.48 g of the silica gel Sylopol 3325 N (manufactured by Grace, dried at 800° C., average particle size 78 μm) in a 250 ml two-neck flask under inert conditions and the solvent was then removed by distillation in vacuo at 50° C. 13.2 g of a free-flowing powder were obtained.

2c) Polymerisation 1.39 g of the partial component A described in 2a) and 1.41 g of the partial component B described in 2b) were introduced, under inert conditions, into a 250 ml glass flask provided with a KPG stirrer, a hot-air blower for heating and cooling and connections for vacuum, argon and butadiene feed. A vacuum was applied and butadiene was then added to the flask up to a pressure of 1150 mbar, with stirring. Over a period of 2 h, the butadiene pressure was kept between 1150 and 1000 mbar at an internal temperature of 60° C. The polymerisation was terminated by removing the butadiene and filling the flask with atmospheric oxygen. 9.3 g of product were obtained.

Example 3

3a) Preparation of Partial Component A 9.79 g of the furnace black N 660 (manufactured by Degussa, average particle size 1 mm) were heated to 120° C. for 2 h in vacuo in a 250 ml two-neck flask. This was then cooled to ambient temperature and argon was added to the flask. 19.5 ml of a solution of 0.49 mmol neodymium versatate in hexane were added to the supporting material under inert conditions. After distilling off the solvent at 50° C. in vacuo, 10.2 g of a free-flowing powder were obtained.

3b) Preparation of Partial Component B

The partial component described in 1b) was used.

3c) Polymerisation 1.17 g of the partial component A described in 3a) and 1.24 g of the partial component B described in 3b) were introduced, under inert conditions, into a 250 ml glass flask provided with a KPG stirrer, a hot-air blower for heating and cooling and connections for vacuum, argon and butadiene feed. A vacuum was applied and butadiene was then added to the flask up to a pressure of 1150 mbar, with stirring. Over a period of 80 min, the butadiene pressure was kept between 1150 and 1000 mbar at an internal temperature of 60° C. The polymerisation was terminated by removing the butadiene and filling the flask with atmospheric oxygen. 17.9 g of product were obtained.

Examples 4–6 a) Preparation of Partial Component A 10.2 g of the support Accurel EP 100 (microporous PP from Akzo Nobel, particle size distribution 400–1000 μm) were heated to 80° C. for 2 h in vacuo in a 500 ml two-neck flask. This was then cooled to ambient temperature and argon was added to the flask. A solution of 0.51 mmol cobalt(II) octanoate in 80 ml toluene was added to the supporting material under inert conditions. After distilling off the solvent at 25° C. in vacuo, 11.0 g of a free-flowing powder were obtained.

b) Preparation of Partial Component B 30 ml of a solution of 9.8 mmol water in toluene were added to 9.8 g of the precipitated silica Vulkasil S (dried at 800° C., average particle size 18 μm) in a 250 ml two-neck flask under inert conditions, the suspension was cooled to −40° C. and then 42.6 ml of a solution of 49 mmol DEAC in hexane was added within 30 min. The suspension was heated to 25° C. within one hour, with stirring, and the solvent was then removed by distillation in vacuo at 25° C. 16.2 g of a free-flowing powder were obtained.

c) Polymerisation

The quantities listed in Table 1 of the partial component A described in 4a) and of the partial component B described in 1b) were introduced, under inert conditions, into a 250 ml glass flask provided with a KPG stirrer, a hot-air blower for heating and cooling and connections for vacuum, argon and butadiene feed. A vacuum was applied and butadiene was then added to the flask up to a pressure of 300 mbar, with stirring. Over a period of 30 min, the butadiene pressure was kept first between 250 and 300 mbar and then for a further 30 min between 400 and 450 mbar and the following polymerisation period was kept between 900 and 950 mbar. The internal temperature was kept within the stated limits throughout the polymerisation period.

The polymerisation was terminated by removing the butadiene and filling the flask with atmospheric oxygen. The quantities of polymer obtained are given in Table 1.

TABLE 1

Details and results of the gas-phase polymerisations of 1,3-butadiene with the catalyst components A (Example 4–6a) and B (Example 4–6b)

| Example | Component A | Component B | Temperature | Polymerisation period | Polymer |
|---|---|---|---|---|---|
| 4 | 4.1 g | 8.3 g | 35 to 40° C. | 5.5 h | 56.6 g |
| 5 | 2.9 g | 2.9 g | 30 to 35° C. | 6.75 h | 52.5 g |
| 6 | 1.4 g | 3.4 g | 25 to 40° C. | 1.5 h | 12.3 g |

What is claimed is:

1. A two-component supported catalyst consisting of:
   a) at least one transition metal compound applied on to an inorganic or polymeric organic supporting material, the metal being selected from the group of the d and f elements of the Periodic Table of Elements,
   b) at least one organometallic compound applied onto an inorganic or polymeric organic supporting material, the metal being selected from the group of the IIa, IIb and IIIb elements of the Periodic Table of Elements, and
   c) optionally, at least one modifier which is supported on the components a) and/or b), the at least one transition metal compound of the component a) being used in a quantity of from 0.1 to 100 mmol, based on 100 g of the supporting material, and the at least one organometallic compound of the component b) being used in a quantity of from 0.1 to 1,000 mmol, based on 100 g of the supporting material, and theoptional at least one modifier of the component c) being used in a quantity of from 0.01 to 500 mmol, based on 100 g of the supporting material, wherein the supporting materials of the components a) and b) are used in a quantitative ratio by weight (g/g) of from $1:10^{-3}$ to 1,000, and at least one of the supporting materials of the components a) and b) has an average particle size before or during a polymerization reaction of <25 μm.

2. A process for preparing the supported catalyst according to claim 1, wherein the component a) is prepared by:
   A1) dissolving or dispersing the at least one transition metal compound and the optional at least one modifier in an inert solvent and/or diluent to form a solution or dispersion at a temperature of from −80 to 150° C.,
   A2) impregnating the supporting material with the solution or dispersions and
   A3) removing the inert solvent and/or diluent at a temperature of from −40 to 150° C., optionally, under a reduced pressure, and wherein component b) is prepared by:
      B1) dissolving or dispersing the at least one organometallic compound and the optional at least one modifier in an inert solvent and/or diluent to form a solution or dispersion at a temperature of from −80 to 150° C.,
      B2) treating the supporting material with the solution or dispersions and
      B3) removing the inert solvent and/or diluent at a temperature of from −40 to 150° C., optionally, under a reduced pressure.

3. The supported catalyst according to claim 1, wherein at least one of the supporting materials of the components a) and b) has an average particle size before or during the polymerization reaction of <10 μm.

4. The supported catalyst according to claim 3, wherein at least one of the supporting materials ofthe components a) and b) has an average particle size before or during the polymerization reaction of <2 μm.

5. The supported catalyst according to claim 1, wherein the quantity of the at least one transition metal compound of the component a) is from 0.5 to 50 mmol, based on 100 g of the supporting material.

6. The supported catalyst according to claim 1, wherein the quantity of the at least one organometallic compound of the component b) is from 0.5 to 500 mmol, based on 100 g of the supporting material.

7. The supported catalyst according to claim 1, wherein the quantity of the optional at least one modifier of the component c) is up to 250 mmol, based on 100 g of the supporting material.

8. The supported catalyst according to claim 1, wherein the quantity of the at least one transition metal compound of the component a) is from 0.5 to 50 mmol, based on 100 g of the supporting material, the quantity of the organometallic compound of the component b) is from 0.5 to 500 mmol, based on 100 g of the supporting material, and the quantity of the optional at least one modifier of the component c) is up to 250 mmol, based on 100 g of the supporting material.

9. The supported catalyst according to claim 1, wherein components a), b) and c) are in a molar ratio of 1:1 to 10,000:0 to 1,000.

10. The supported catalyst according to claim 9, wherein the molar ratio is 1:1 to 1,000:0 to 100.

11. The supported catalyst according to claim 1, wherein the at least one transition metal compound of the component a) comprises an element selected from the group consisting of lanthanum, cerium, praseodymium, neodymium, terbium, dysprosium, holmium, erbium, titanium, zirconium, vanadium, chromium, cobalt, iron and nickel.

12. The supported catalyst according to claim 11, wherein the element is lanthanum, cerium, neodymium, cobalt, nickel, titanium or vanadium.

13. The supported catalyst according to claim 12, wherein the element is lanthanum, neodymium or cobalt.

14. The supported catalyst according to claim 1, wherein the at least one transition metal compound of the component a) comprises an element and an inorganic group or an organic group or an organometallic compound.

15. The supported catalyst according to claim 14, wherein the inorganic group is a halide, sulfate, sulfonate, phosphate, phosphonate or carbonate group, the organic group is a β-diketone, carboxylate, alcoholate, phenolate or amide group, and the organometallic compoundis amonocyclopentadienyl, monoindenyl ormonofluorenyl metal compound.

16. The supported catalyst according to claim 1, wherein the at least one organometallic compound of the component b) is a compound of a metal of Group IIa, IIb or IIIb of the Periodic Table of Elements or an aluminoxane.

17. The supported catalyst according to claim 16, wherein the metal is magnesium, calcium, boron, aluminium or zinc.

18. The supported catalyst according to claim 17, wherein the metal is aluminium or magnesium.

19. The supported catalyst according to claim 16, wherein the organometallic compound is a methylaluminoxane or an iso-butylaluminoxane.

* * * * *